March 22, 1966  C. T. RIDENOUR  3,241,644
CLUTCH DISC
Filed March 11, 1963
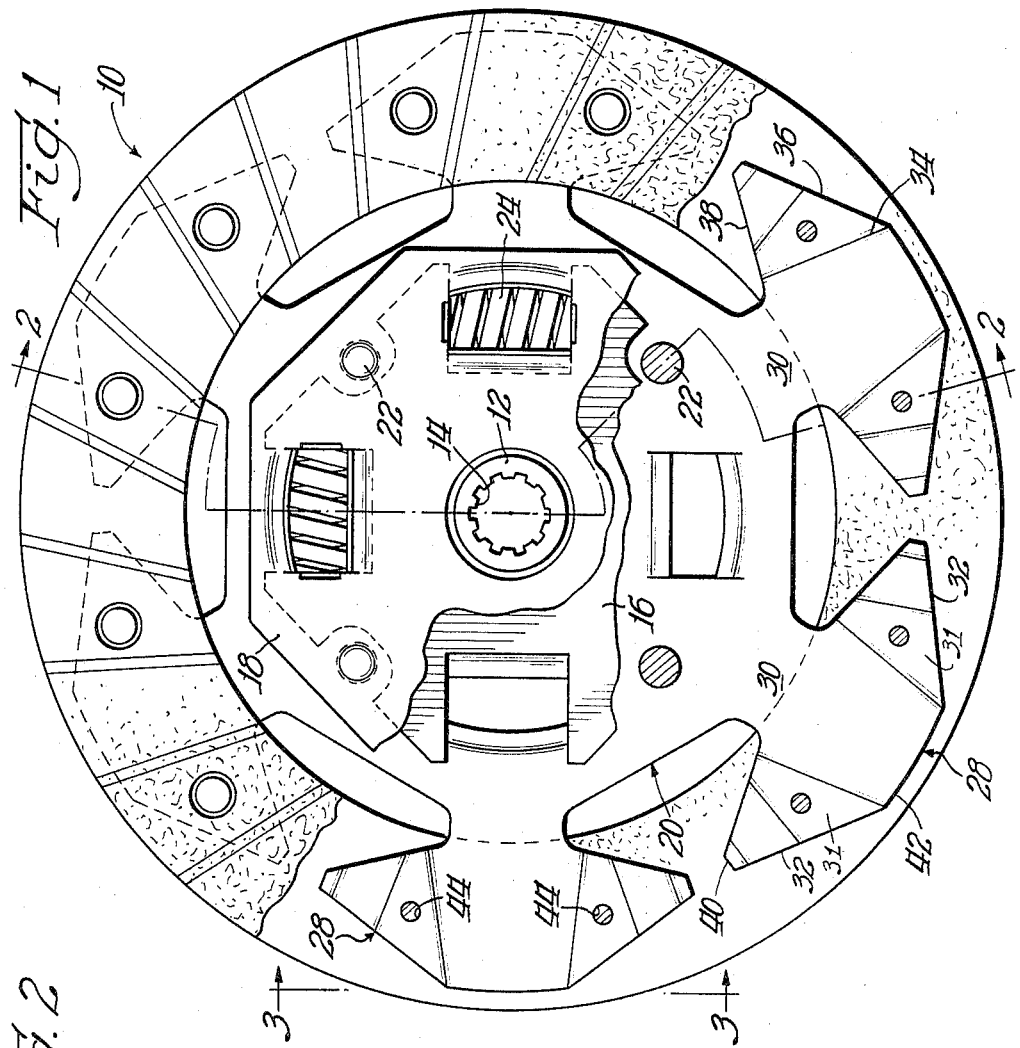
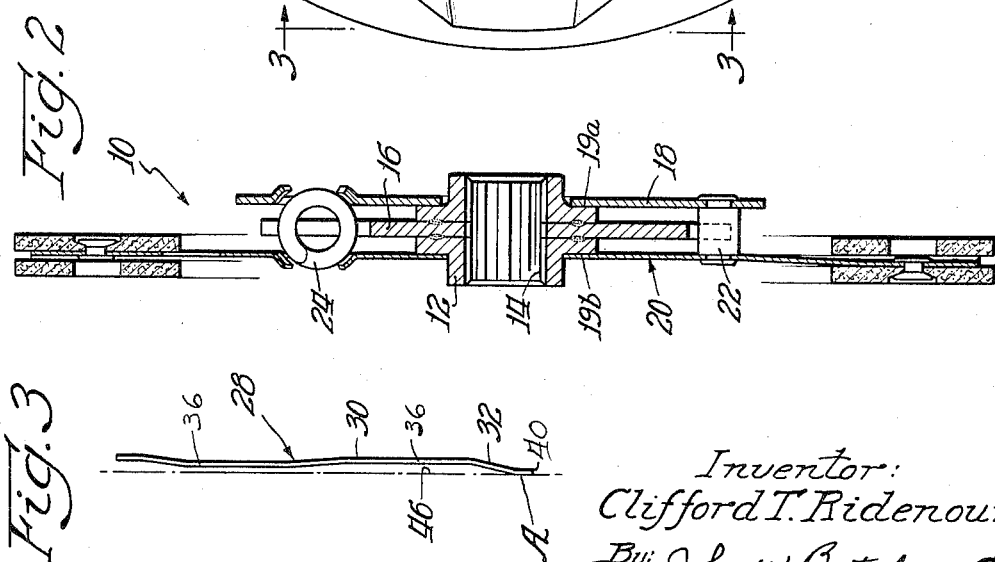
Inventor:
Clifford T. Ridenour
By: John W. Butcher Atty.

United States Patent Office 3,241,644
Patented Mar. 22, 1966

3,241,644
CLUTCH DISC
Clifford T. Ridenour, Oakland County, Mich., assignor to Borg-Warner Corporation, a corporation of Illinois
Filed Mar. 11, 1963, Ser. No. 264,305
4 Claims. (Cl. 192—107)

This invention relates to improvements in clutch plates and more particularly to clutch plates of the multiple stage cushion type suitable for use in motor vehicles.

Briefly described, the clutch plate includes a plurality of radially extending facing support spokes having T-shaped heads with side portions of triangular or cantilever configuration. This clutch plate exhibits unusual engagement characteristics in that upon initial engagement of the friction facing material, the cantilever portions provide for a low rate of flexibility initially and as engagement progresses the moment arm of the cantilever portions about the spoke shortens while the facing support area of these portions increases.

Each spoke head comprises a lining support area characterized by having a pair of generally triangular shaped portions joined at their base portion to the mid portion of the radially extending spoke. Each of the generally triangular shaped portions includes an outer generally circumferential edge portion and an inner generally circumferential edge portion with the outer edge portion being of a generally arcuate shape and the inner edge portion being of generally arcuate shape. The inwardly extending spokes join a generally flat central portion. Each spoke head has an undulated form which, looking at the periphery, resembles a flattened S and, being symmetrical about the center line of the spoke and the plane of the central portion. Each triangular portion includes a flat trapezium shaped land adjacent the base of the triangle and providing a primary support surface for the facing. The form height, with respect to the central plane is higher at the outer edge of the land than on the inner edge. Thus, these supporting lands are concave on their respective sides. The portion of the spoke intermediate the lands is thus twisted more at the outer edge than at the inner portion. Likewise, the outer edges of the triangular portions extending from the lands have a greater form height than their counterparts at the inner edge.

FIGURE 1 is an elevational view, partially in cross-section, of a friction clutch plate constructed in accordance with this invention.

FIGURE 2 is a view, partially in cross-section, taken along lines 2—2 of FIGURE 1.

FIGURE 3 is a view taken along lines 3—3 of FIGURE 1.

Referring now to the drawing and more particularly, FIGURE 1, the clutch plate assembly 10 comprises a hub 12 having splines 14 provided internally therein for engagement with a transmission drive shaft or other suitable driven member. The hub 12 includes a radial extending flange 16. A washer 18 and a circular steel clutch plate 20 are rotatably mounted on the hub 12 about the flange 16. The washer 18 and clutch plate 20 are fixed (axially) with respect to each other by way of a plurality of shoulder type rivets 22 and shoulders 19a and 19b formed on the hub 12.

Vibration dampening springs 24 provide a driving connection between the radially extending flange 16 and the washer 18—clutch plate 20.

The clutch plate 20 includes a plurality of yieldable clutch facing support spoke heads 28, each of which includes a radially extending mid portion 30 bordered by a pair of trapezium shaped lands 31 and a pair of generally triangular shaped cantilever sections 32. Each of the generally triangular shaped cantilever sections has a base portion 34 joined to the lands 31 adjacent the mid portion 30, an outer side 36, an inner side 38, and an apex 40. The apex 40 extends circumferentially from the radially extending mid portion in a direction radially inward from the outer terminal end 42 of the mid portion 30. Each of the generally triangular land shaped cantilever sections 31 includes a rivet hole 44 suitable for attaching the respective friction facing material for that land to the spoke head 28.

The general configuration of the radially extending spoke heads 28 is of particular importance in the present invention. Considering the spoke heads 28 in their natural state, i.e., prior to attaching the clutch facing material thereto, and with point A of the apex of every other cantilever section 32 resting on a flat surface 46 (FIGURE 3). The outer side 36 forms an arc extending from the apex 40 past the lands 31 to the center line of the spoke at the mid portion 30 and, as the spoke head 28 is substantially symmetrical about its center line, the other outer side 36 of the opposite triangular-shaped section forms an arc the reverse of the above mentioned arc. The inner side 38 also forms an arc extending from the apex to the center line of the mid portion; however, the form height of this arc with reference to the plane of the central portion of the plate is less than the form height of the arc formed by the outer side 36 of the triangular-shaped portion. Thus, the general form of the spoke head is that it has less form at the inner edge than at the outer. Since the facings are riveted to the lands of the spoke heads independently of each other, the facings are each caused to be shaped slightly concave to conform to the form in the spoke head.

In opertion and with the respective elements moving toward engagement under the action of the pressure springs loading the pressure plate to compress the clutch plate, the portions in the region of the apex yield first. At first, the resistance offered by this triangular-shaped portion is small; however, upon increased engagement, the resistance increases rapidly upon further comprission of the cantilever arms. After the initial compression of the apex portions there is a simultaneous flattening of the remaining part of the cantilever portion together with an un-twisting of the mid portion and the neck portion of the spoke head. An important feature of this configuration is that as engagement progresses, the moment arm of the cantilever portion decreases and this is accompanied by an increase in supporting area which reaches a maximum when the clutch is fully engaged and the clutch plate is completely flat.

While I have illustrated and described herein the preferred embodiment of my invention, it will be apparent that the invention is to be limited only by the spirit and scope of the appended claims.

I claim:

1. A friction clutch plate assembly comprising a hub; a circular steel plate mounted on said hub concentric with respect thereto; a plurality of yieldable clutch facing support spoke heads extending radially outwardly from said circular steel plate having an outer terminal end; said plurality of yieldable clutch facing support spoke heads being particularly characterized as having a radially extending mid portion bordered by facing supporting lands each of which includes an outer facing supporting land edge and an inner facing supporting land edge with cantilever sections extending therefrom, said circumferentially extending cantilever sections being of a generally triangular configuration having a base portion, an outer side, an inner side and an apex with said base portion joining said lands adjacent said radially extending mid portion and with said apex extending circumferentially and radially inwardly from the outer terminal end of said radially extending mid portion said outer facing supporting land edge and said inner facing supporting land edge defining outer arcuate and inner arcuate shapes respectively, the form height of said outer arcuate shape with respect to the center of said cantilever section being greater than the form height of said inner arcuate shape whereby the facing supporting lands are concave on their respective sides.

2. An apparatus in accordance with claim 1 wherein said lands and said cantilever sections extend symmetrically from said mid portion.

3. An apparatus in accordance with claim 1 wherein said circumferentially extending cantilever sections extend in an arc from the center line of said mid portion in opposite directions and are symmetrical with respect to said center line.

4. An apparatus in accordance with claim 1 wherein said lands and said cantilever sections extend out of the plane of said circular steel plate such that initial engagement of the clutch results in a minor resistance to bending of said cantilever section and subsequent engagement of the clutch results in shortening the moment arm of said cantilever section about said mid section axis with a consequent increase in support area between the clutch facing material and said spoke head.

References Cited by the Examiner
UNITED STATES PATENTS

| | | | |
|---|---|---|---|
| 2,171,908 | 9/1939 | Beringer | 192—68 |
| 2,283,112 | 5/1942 | Wemp | 192—107 |
| 2,547,427 | 4/1951 | Zeidler | 192—107 |
| 2,566,394 | 9/1951 | Zeidler | 192—107 |
| 2,596,588 | 5/1952 | Narrin | 192—107 |
| 2,742,992 | 4/1956 | Timm | 192—107 |

DAVID J. WILLIAMOWSKY, *Primary Examiner.*